US005792306A

United States Patent [19]

Verbeiren

[11] Patent Number: 5,792,306
[45] Date of Patent: Aug. 11, 1998

[54] SEALING APPARATUS USEFUL IN BAG-MAKING MACHINE

[75] Inventor: Wim Verbeiren, Lede, Belgium

[73] Assignee: FMC Corporation, Chicago, Ill.

[21] Appl. No.: 732,756

[22] Filed: Oct. 18, 1996

[51] Int. Cl.⁶ ............................................. B30B 5/04
[52] U.S. Cl. .................... 156/358; 156/555; 156/583.1; 100/153; 100/327; 425/373
[58] Field of Search ............................. 156/358, 555, 156/583.1, 583.5; 425/373; 100/153, 327

[56] References Cited

U.S. PATENT DOCUMENTS

| | | | |
|---|---|---|---|
| 2,897,875 | 8/1959 | Rusch et al. | 156/555 X |
| 3,825,462 | 7/1974 | Ettel | 156/555 X |
| 4,287,017 | 9/1981 | Lopata et al. | 156/583.5 |
| 4,361,456 | 11/1982 | Reschke | 156/179 |
| 4,642,084 | 2/1987 | Gietman, Jr. | 493/190 |
| 4,647,332 | 3/1987 | Ranger | 156/285 |
| 4,744,854 | 5/1988 | Schenz | 156/498 |
| 5,167,978 | 12/1992 | Gersbeck | 425/373 |
| 5,223,071 | 6/1993 | Gersbeck | 156/358 |

Primary Examiner—James Sells
Attorney, Agent, or Firm—Rockey, Milnamow & Katz, Ltd.

[57] ABSTRACT

In an apparatus useful for sealing layers of a web comprised of plastic film layers to one another in a bag-making machine, a sealing drum having a cylindrical surface is employed. A sealing blanket is deployed about plural blanket rolls and about the sealing drum so that a substantial portion of the cylindrical surface of the sealing drum is wrapped by the sealing blanket with the wrapping surface facing the cylindrical surface while the remaining portion of the cylindrical surface is not wrapped thereby at any given time. A nip roll acts together with one of the blanket rolls so as to define a nip. An idle roll is located near the nip. The sealing apparatus is operable so that the sealing blanket is drawn through the nip with the wrapping surface facing the nip roll, so that the web is drawn through the nip, between the nip roll and the wrapping surface of the sealing blanket, then around the idle roll, and then around the sealing drum, between the wrapping surface of the sealing blanket and the cylindrical surface of the sealing drum. The nip roll is pressed pneumatically with an adjustable pressure toward the blanket roll acting together with the nip roll, whereby the nip roll controls the tension on the web being drawn through the nip.

6 Claims, 1 Drawing Sheet

U.S. Patent   Aug. 11, 1998   5,792,306
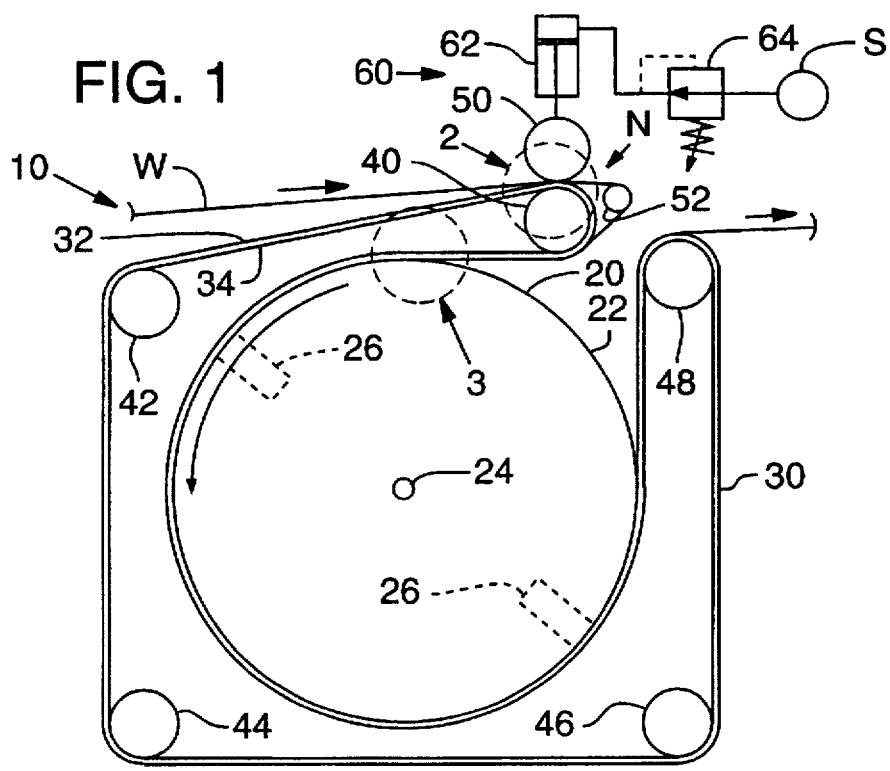
FIG. 1
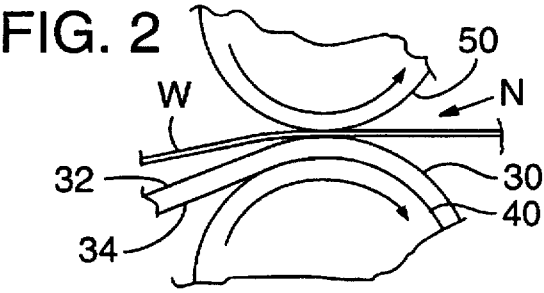
FIG. 2
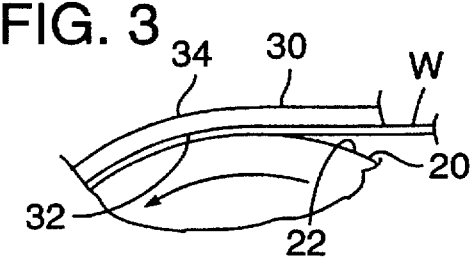
FIG. 3
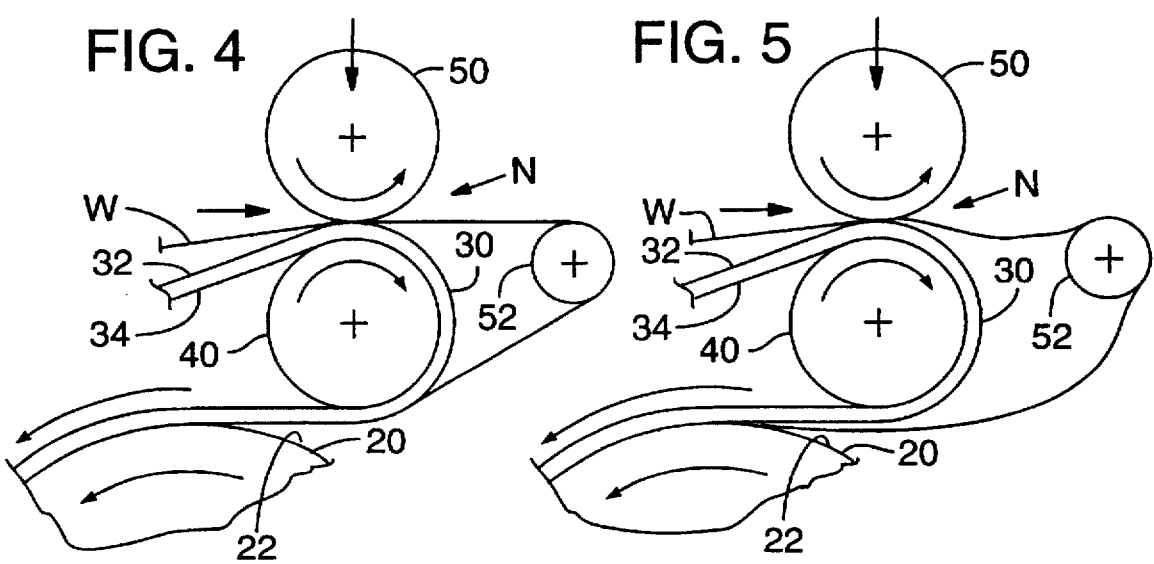
FIG. 4
FIG. 5

SEALING APPARATUS USEFUL IN BAG-MAKING MACHINE

TECHNICAL FIELD OF THE INVENTION

This invention pertains to a sealing apparatus, which is useful for sealing web layers to one another in a bag-making machine. The sealing apparatus employs a sealing drum, a sealing blanket, and other elements, in a novel combination, by which the tension on a web comprised of plural layers of plastic film can be precisely controlled while the web is being sealed.

BACKGROUND OF THE INVENTION

As known heretofore in a bag-making machine for making plastic bags, such as trash bags, from a web comprised of plural layers of plastic film, a sealing apparatus comprises a sealing drum having a cylindrical surface, one or several sealing bars mounted operatively within the sealing drum and opposed diametrically to each other, and a sealing blanket, which is an endless loop having a wrapping surface and an opposite surface. The sealing blanket is deployed around several blanket rolls and around the sealing drum so that a substantial portion of the cylindrical surface of the sealing drum is wrapped by the wrapping surface of the sealing blanket while the remaining portion of the cylindrical surface of the sealing drum is not wrapped thereby at any given time.

As discussed above, the sealing apparatus is operable so that a web comprised of layers of plastic film is drawn around the sealing blanket as the sealing blanket is drawn around one of the rolls and then around the sealing drum, between the sealing blanket and the sealing drum. The sealing bars form symmetrically disposed seals in the web as the web is drawn around the sealing drum.

A similar apparatus is disclosed in Gietman, Jr. U.S. Pat. No. 4,642,084, which issued on Feb. 10, 1987, to Custom Machinery Design, Inc. As disclosed therein, a dancer bar is employed to control tension on a web before the web passes over such a roll and then around a sealing drum, between a sealing blanket and the sealing drum.

This invention has resulted from ongoing efforts to improve a sealing apparatus for a bag-making machine.

SUMMARY OF THE INVENTION

This invention provides a sealing apparatus for sealing layers of a web of plastic film to one another in a bag-making machine. The sealing apparatus comprises a sealing drum, a sealing blanket, and plural blanket rolls, each blanket roll being rotatable about an axis parallel to the sealing drum axis. As novel features, whereby the tension on a web comprised of plural layers of plastic film can be precisely controlled while the web is being sealed, the sealing apparatus comprises a nip roll acting together with one of the blanket rolls so as to define a nip and means for pressing the nip roll with a controlled pressure, preferably an adjustable pressure, toward the blanket roll acting together with the nip roll. A pneumatic means is preferred.

Being an endless loop, the sealing blanket has two expansive surfaces, namely a wrapping surface and an opposite surface. The sealing blanket is deployed around the sealing drum and around the blanket rolls, which are arranged so that a substantial portion of the cylindrical surface of the sealing drum is wrapped by the sealing blanket with the wrapping surface facing the cylindrical surface while the remaining portion of the cylindrical surface is not wrapped by the sealing blanket at any given time.

The sealing apparatus is operable so that the sealing blanket is drawn through the nip with the wrapping surface facing the nip roll, so that a web comprised of layers of plastic film is drawn through the nip, between the nip roll and the wrapping surface of the sealing blanket, so that the nip roll applies the controlled pressure to the web being drawn through the nip, and so that the web leaving the nip is drawn around the sealing drum, between the wrapping surface of the sealing blanket and the cylindrical surface of the sealing drum. Because the nip roll applies the controlled pressure to the web being drawn through the nip, the nip roll controls the tension on the web being drawn therethrough.

Preferably, the sealing apparatus further comprises an idle roll rotatable about its own axis, which is parallel to the sealing drum axis. Thus, the sealing apparatus is operable so that the web leaving the nip are drawn around the idle roll before being drawn around the sealing drum, between the opposite surface of the sealing blanket and the cylindrical surface of the sealing drum.

When the sealing blanket is drawn around the blanket roll acting together with the nip roll, the wrapping surface has a peripheral speed that is higher than the peripheral speed of the wrapping surface when the sealing blanket is drawn around the sealing drum. Because the web is drawn with the wrapping surface when the web is drawn around the blanket roll acting together with the nip roll and when the web is drawn around the sealing drum, the tension on the web being drawn around the sealing drum depends upon the slippage, if any, between the web and the sealing blanket when the web and the sealing blanket are drawn around the sealing drum. When the pressure applied by the nip roll is adjusted, the slip of the web on the sealing blanket, and therefore the tension on the web, is adjusted before the web is drawn around the sealing drum. Desirably, the tension on the web being delivered to the sealing drum is adjusted so as to be sufficient, but not significantly more than is sufficient, to remove any slack in the web between the nip and the sealing drum.

These and other objects, features, and advantages of this invention are evident from the following description of a preferred embodiment of this invention, with reference to the accompanying drawings.

BRIEF DESCRIPTION OF THE DRAWINGS

FIG. 1 is a schematic representation of a sealing apparatus for a bag-making machine, the sealing apparatus constituting a preferred embodiment of this invention.

FIGS. 2 and 3, on a larger scale compared to FIG. 1, are fragmentary details, each of which is taken generally in a region indicated in FIG. 1 by a broken-line circle and a correspondingly numbered arrow.

FIGS. 4 and 5, on a larger scale compared to FIG. 1 but a smaller scale compared to FIGS. 2 and 3, are fragmentary details of certain elements of the sealing apparatus, as shown in circular regions delineated by broken lines and correspondingly numbered arrows in FIG. 1.

DETAILED DESCRIPTION OF THE PREFERRED EMBODIMENT

In FIG. 1, a sealing apparatus 10 is shown schematically, which constitutes a preferred embodiment of this invention. The sealing apparatus 10 is used in a bag-making machine (not shown otherwise) for forming heat seals in a web W, which is comprised of plural layers of a heat-sealable, plastic film used to make plastic bags, such as trash bags. The sealing apparatus 10 comprises a sealing drum 20, a sealing blanket 30, and other elements to be later described, in a novel combination, by which the tension on a web W comprised of plural layers of plastic film can be precisely controlled while the web is being sealed.

The sealing drum 20 has a cylindrical surface 22. As mounted rotatably to a machine frame (not shown) via a central axle 24, the sealing drum 20 is rotatable about a sealing drum axis, which is defined by the central axle 24. Two sealing bars 26, which are shown in broken lines, are mounted operatively and symmetrically within the sealing drum 20, in a known manner. The sealing bars 26 are operable, in a known manner, so as to form heat seals (not shown) across the web W as the web W is drawn around the sealing drum 20.

The sealing blanket 30 may have an end-to-end juncture (not shown) but may be nonetheless regarded as being an endless loop. The sealing blanket 30 has two expansive surfaces, namely a wrapping surface 32 and an opposite surface 34.

The sealing apparatus 10 has four driven rolls 40, 42, 44, 46 and a driving roll 48, which together may be conveniently called blanket rolls. As mounted rotatably to the machine frame, each blanket roll is rotatable about its own axis, which is parallel to the sealing drum axis. The driving roll 48 is arranged to be rotatably driven by a motor (not shown) of the sealing apparatus 10. As shown, the driven rolls 42, 44, 46 and the driving roll 48 are arranged in a semi-rectangular array so that an imaginary plane comprising the axes of the driven roll 42 and the driving roll 48 is disposed above the cylindrical surface 22 of the sealing drum 20 and so that an imaginary plane comprising the axes of the driven rolls 44, 46 is disposed below the cylindrical surface 22 thereof. The driven roll 40 is arranged so that its axis is disposed above the imaginary plane comprising the axes of the driven roll 42 and the driving roll 48, and between an imaginary, vertical plane comprising the sealing drum axis and an imaginary, vertical plane comprising the axis of the driving roll 48.

As shown, the sealing blanket 30 is deployed so as to be successively driven around the driven roll 40, around the sealing drum 20, and around the driven rolls 42, 44, 46 with the wrapping surface 32 facing the cylindrical surface 22 of the sealing drum 20 and with the opposite surface 34 facing the driven rollers 40, 42, 44, 46 and the driving roll 48. Thus, at any given time, a substantial portion of the cylindrical surface 22 of the sealing drum 20 is wrapped by the sealing blanket 30 with the wrapping surface 32 facing the cylindrical surface 22 while the remaining portion of the cylindrical surface 22 is not wrapped by the sealing blanket 30.

As novel features, the sealing apparatus 10 comprises a nip roll 50 acting together with the driven roll 40 so as to define a nip N having an entering side and an exiting side, an idle roll 52 mounted rotatably to the machine frame and rotatable about is own axis, which is parallel to the sealing drum axis. The idle roll 52 is located near the exiting side of the nip N. As another novel feature, the sealing apparatus 10 comprises a pneumatic means 60 for pressing the nip roll 50 toward the driven roll 40. As pressed toward the driven roll 40, the nip roll 50 would be thus pressed against the driven roll 40, if nothing were interposed between the nip roll 50 and the driven roll 40.

The pneumatic means 60 comprises a pneumatic piston-cylinder mechanism 62, which is connected to a source S of air pressure, via a control device 64. The mechanism 62 is arranged to press the nip roll 50 toward the driven roll 40, as discussed above, if air pressure is applied to the mechanism 62. The control device 64 is adjustable so as to adjust air pressure applied to the mechanism 62. As shown, the control device 64 is a pressure regulator, which is adjustable. A Type ADV-32-5 piston-cylinder mechanism available commercially from Festo of Brussels, Belgium, is suitable for the piston-cylinder mechanism 62. A Type R11-200-RNMDG1/4 pressure regulator available commercially from Norgren of Brussels, Belgium, is suitable for the pressure regulator employed as the control device 64.

As shown, the sealing apparatus 10 is operable so that the sealing blanket 30 is drawn through the nip N with the wrapping surface 32 facing the nip roll 50, so that the web W is drawn into the entering side of the nip N and through the nip N, between the nip roll 50 and the wrapping surface 32 of the sealing blanket 30, and so that the web W leaving the nip N is drawn around the sealing drum 30, between the wrapping surface 32 of the sealing blanket 30 and the cylindrical surface 22 of the sealing drum 20. The sealing bars 26 are operable, as described above, while the web W is being drawn around the sealing drum 20. After leaving the cylindrical surface 22 of the sealing drum 20, the web W is drawn with the sealing blanket 30 until the sealing blanket 30 reaches the driving roller 48, whereupon the web W is drawn away by other means (not shown) for further processing or handling operations.

When the sealing blanket 30 is drawn around the driven roll 40, which acts together with the nip roll 50, the wrapping surface 32 has a peripheral speed that is higher than the peripheral speed of the wrapping surface 32 when the sealing blanket 30 is drawn around the sealing drum 30. Because the web W is drawn with the wrapping surface 32 when the web W is drawn around the driven roll 40 and when the web W is drawn around the sealing drum 30, the tension on the web W is lowered between the nip N and the sealing drum 20. The tension on the web W when drawn around the sealing drum 20 depends upon the slippage, if any, between the web W and the sealing blanket 30 when the web W and the sealing blanket 30 are drawn around the sealing drum 20.

The sealing blanket 30 has a neutral plane, which is equidistant between the wrapping surface 32 and the opposite surface 34, and which moves at a constant speed around the driven rolls 40, 42, 44, 46, around the driving roll 48, and around the sealing drum 20. Thus, when the sealing blanket 30 is driven around the driven rolls 40, 42, 44, 46 and around the driving roll 48, the wrapping surface 32 has a peripheral speed that is higher than the constant speed of the neutral plane. Also, when the sealing blanket 30 is driven around the sealing drum 20, the wrapping surface 32 has a peripheral speed that is lower than the constant speed of the neutral plane.

If no slippage is permitted between the web W and the sealing blanket 30 at the nip N, more film is delivered to the sealing drum 30 than the sealing drum 30 can handle and the web W is delivered to the sealing drum 30 without any tension, as suggested by FIG. 5. If the web W is permitted to slip freely on the sealing blanket 30 at the nip N, the tension on the web W being delivered to the sealing drum 30 tends to be substantially equal to the tension on the web W being delivered to the nip N. Thus, increasing the pressure applied by the nip roll 50 to the web W being drawn through the nip N with the sealing blanket 30 decreases the slippage between the web W and the sealing blanket 30 at the nip N, whereas decreasing the pressure applied by the nip roll 50 to the web W being drawn through the nip N with the sealing blanket 30 increases the slippage between the web W and the sealing blanket 30 at the nip N.

Therefore, when the control device 64 of the pneumatic means 60 is adjusted so as to adjust the pressure applied by the nip roll 50 to the web W being drawn through the nip N with the sealing blanket 30, the tension on the web W being delivered to the sealing drum 20 is adjusted. Desirably, the tension on the web W being delivered to the sealing drum 30 is adjusted so as to be sufficient, but not significantly more than is sufficient, to remove any slack in the web W between the nip N and the sealing drum 30, as suggested in FIG. 4.

Various modifications may be made in the preferred embodiment described above without departing from the scope and spirit of this invention.

I claim:

1. A sealing apparatus useful for sealing layers of a web comprised of plastic film layers to one another in a bag-making machine, the sealing apparatus comprising:

(a) a sealing drum having a cylindrical surface, the sealing drum being rotatable about a sealing drum axis, said sealing drum having at least one sealing bar applied onto said cylindrical surface for sealing intermittent portions of a web, (b) plural blanket rolls, each blanket roll being rotatable about an axis parallel to the sealing drum axis, (c) a nip roll acting together with one of the blanket rolls so as to define a nip, (d) means for pressing the nip roll with a control pressure toward the blanket roll acting together with the nip roll to control the tension under which said web of plastic film layers is drawn about said sealing drum, (e) a sealing blanket being an endless loop having two expansive surfaces, namely a wrapping surface and an opposite surface, the sealing blanket being deployed around the sealing drum and the blanket rolls, which are arranged so that a substantial portion of the cylindrical surface of the sealing drum is wrapped by the sealing blanket with the wrapping surface facing the cylindrical surface while the remaining portion of the cylindrical surface is not wrapped by the sealing blanket at any given time, wherein the sealing apparatus is operable so that the sealing blanket is drawn through the nip with the wrapping surface facing the nip roll, so that a web comprised of plastic film layers is drawn under tension through the nip, between the nip roll and the wrapping surface of the sealing blanket, so that the nip roll applies the controlled pressure to the web being drawn through the nip, and so that the web leaving the nip is drawn around the sealing drum, between the wrapping surface of the sealing blanket and the cylindrical surface of the sealing drum, whereby the nip roll controls the tension on the web being drawn through the nip.

2. The sealing apparatus of claim 1 further wherein the means for pressing the nip roll with a controlled pressure toward the blanket roll acting together with the nip roll is arranged for pressing the nip roll with an adjustable pressure toward the blanket roll acting together with the nip roll.

3. The sealing apparatus of claim 2 further wherein the means for pressing the nip roll with an adjustable pressure toward the blanket roll acting together with the nip roll is a pneumatic means.

4. The sealing apparatus of claim 1 further comprising an idle roll rotatable about an axis, which is parallel to the sealing drum axis, the sealing apparatus being operable so that the web leaving the nip are drawn around the idle roll before being drawn around the sealing drum, between the opposite surface of the sealing blanket and the cylindrical surface of the sealing drum.

5. The sealing apparatus of claim 4 further wherein the means for pressing the nip roll with a controlled pressure toward the blanket roll acting together with the nip roll is arranged for pressing the nip roll with an adjustable pressure toward the blanket roll acting together with the nip roll.

6. The sealing apparatus of claim 5 further wherein the means for pressing the nip roll with an adjustable pressure toward the blanket roll acting together with the nip roll is a pneumatic means.

* * * * *